Figure 1:
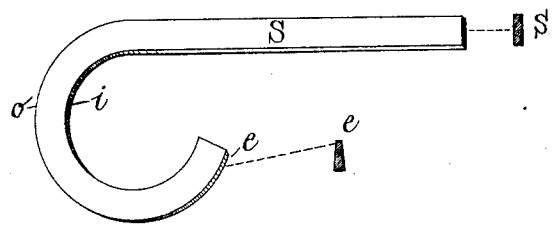

(No Model.) 3 Sheets—Sheet 1.
A. G. WATERHOUSE.
CORE FOR ELECTROMAGNETS.

No. 558,539. Patented Apr. 21, 1896.

ATTEST:
Henry Hirsch.
Wm. H. Capel.

INVENTOR:
Addison G. Waterhouse (No Model.) 3 Sheets—Sheet 2.

A. G. WATERHOUSE.
CORE FOR ELECTROMAGNETS.

No. 558,539. Patented Apr. 21, 1896.

ATTEST:
Henry Hirsch.
Wm H Capel.

INVENTOR:
Addison G. Waterhouse (No Model.) 3 Sheets—Sheet 3.
A. G. WATERHOUSE.
CORE FOR ELECTROMAGNETS.
No. 558,539. Patented Apr. 21, 1896.
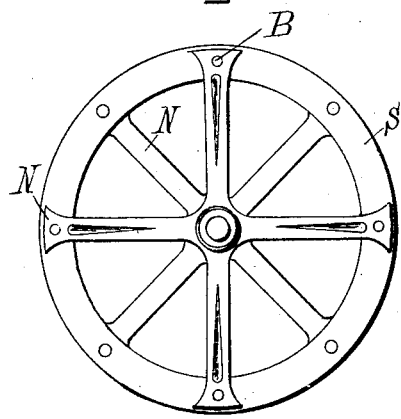
Fig. 14.
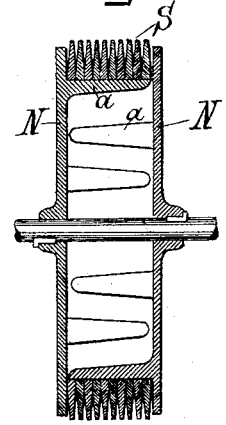
Fig. 15.
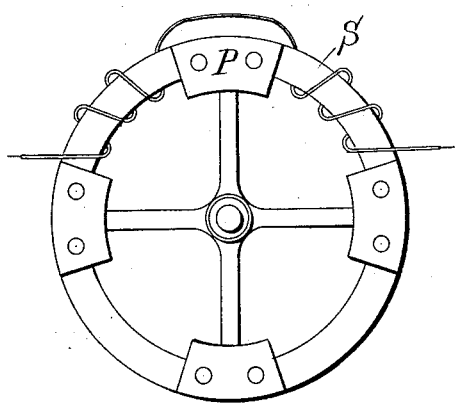
Fig. 16.
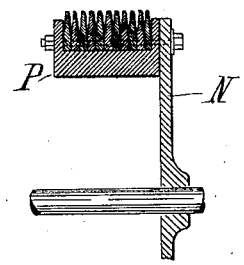
Fig. 17.
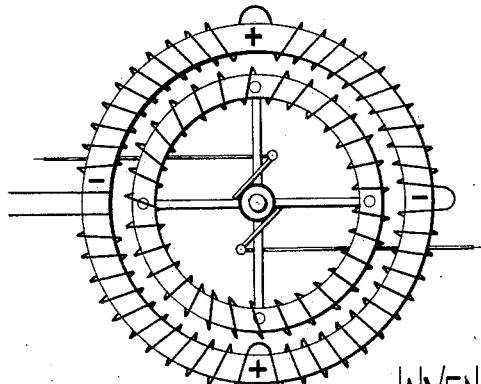
Fig. 18.
Fig. 19.
ATTEST:
Henry Hirsch.
Wm H Capel
INVENTOR:
Addison G. Waterhouse

UNITED STATES PATENT OFFICE.

ADDISON G. WATERHOUSE, OF HARTFORD, CONNECTICUT.

CORE FOR ELECTROMAGNETS.

SPECIFICATION forming part of Letters Patent No. 558,539, dated April 21, 1896.

Application filed October 16, 1894. Serial No. 526,046. (No model.)

*To all whom it may concern:*

Be it known that I, ADDISON G. WATERHOUSE, a citizen of the United States, and a resident of Hartford, in the State of Connecticut, have invented certain new and useful Cores for Electromagnets, of which the following is a specification.

My invention relates to the construction of cores for electromagnets, and more particularly to laminated cores of curved, bent, or annular form.

The invention is especially useful in making circular or curved cores of large radius for use in the field and armature of dynamo-electric generators and motors.

The object of the invention is to simplify and cheapen the construction of cores of this character when laminated or made of strips or thin bars or sheets of iron side by side.

My invention has also in view the formation of the core in such way as to prevent the circulation of Foucault currents and the attachment or bolting together of the several turns or convolutions in a manner to make a rigid and strong core.

My invention consists, essentially, of a curved or annular magnet-core composed of ribbons or comparatively thin strips of iron rolled on one edge, so that one edge will be longer than the other, thereby causing the strip to curve edgewise and form a curve whose radius is that desired in the core or magnetic axis of the magnet and whose radius or extent of curve is determined by the extent to which the outer edge of the strip or bar is elongated by the rolling or compressing process. Preferably the core is constructed of a continuous spiral formed by continuously rolling the edge of a bar or strip and compressing it to such extent as to cause the spiral to form upon a radius or diameter corresponding approximately to that of the finished magnet. After forming the spiral the several turns may be closed together, so that the flat surface of each turn will lie against its neighbor and the whole spiral will form a compact cylinder of the required diameter and length for the annular core of the armature, field-magnet, or other electro-magnet.

In the accompanying drawings, Figures 1 to 5, inclusive, illustrate the formation of a continuous bar or strip into the core of a cylindrical or annular form. Figs. 6 to 13, inclusive, show in cross-section the different forms of the strip before and after the forming operation. Fig. 14 shows in side elevation the manner in which a continuous spiral may be supported on the spider for an armature. Fig. 15 shows a modified spider or frame in vertical section. Fig. 16 is a side elevation of the armature furnished with attached pole-pieces. Fig. 17 is a cross-section through one of said pole-pieces. Fig. 18 illustrates in general diagram a motor or dynamo having annular field and armature cores constructed in accordance with my invention. Fig. 19 shows a strip of iron constituting a segment of a circle formed by rolling or compression of its outer edge and adapted for use in building up a core.

In Fig. 1 a bar or strip of iron S, having considerable width and little thickness, is shown at part of its length straight and at another part as curved or bent edgewise to the desired form for the armature-core by having its outer edge $o$ compressed or rolled down thinner than its original thickness at its straight portion, thereby making the edge $o$ longer and thinner than the inner edge $i$, as indicated at $e$.

Figure 2:
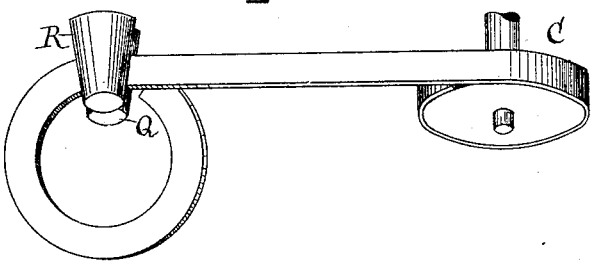
Figure 3:
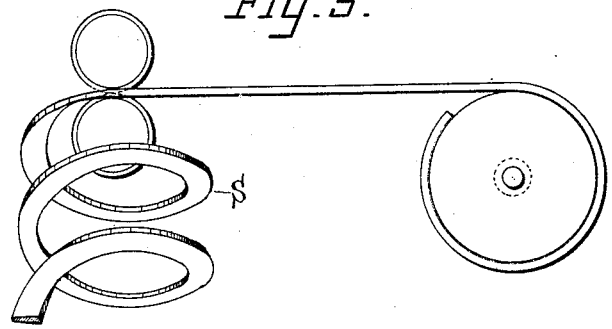

The curved form extended would obviously constitute a circle and further extended would form a spiral which, if closed together, would make a cylinder or ring in which the sides of the iron strip would lie together, and the elongated rolled or compressed outer edge would form the outer periphery, while the inner edge would retain the original thickness of the strip at the straight portion thereof. This elongation of the outer edge to form the desired curve may be done between rolls, as indicated at Figs. 2 and 3, where the strip S is shown as fed from a continuous coil C, between two conical rollers R Q. The adjustment of the space between the rolls or the angle formed by their opposed conical surfaces is such that the edge $o$ of the strip S, passing between the same, will be rolled down thinner, while the edge $i$ will retain the original thickness or will be compressed or rolled to a less extent, this operation resulting in drawing out the outer edge and causing the strip to assume a curve edgewise, which, if extended, will form a circle corresponding in diameter to the relative extent of compression of the inner and outer edges, and if still further continued will result in the formation of a continuous spiral, as indicated in Fig. 3.

Figure 4:
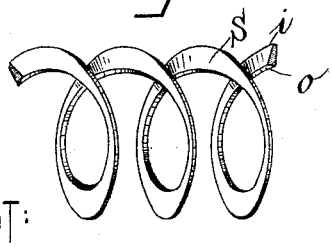
Figure 5:
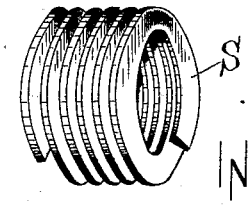

Fig. 4 shows the spiral as open, and Fig. 5 shows the same compressed endwise or with its turns closed together, so as to make a cylinder of laminated strips of iron, the separate turns of which are arranged edgewise to the periphery of the cylinder and lie side by side against one another. The spiral thus formed may be used as the core for a cylindrical or annular electromagnet of any kind, and the successive turns or portions of the strip may be insulated from one another in any desired manner.

Figs. 6 to 13 show the forms in cross-section which the strip may have before and after rolling.

Figure 6:
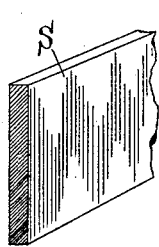
Figure 7:

Fig. 6 shows a strip rectangular in cross-section before rolling, and Fig. 7 the shape which it may be given by compressing or rolling it, so as to displace or draw the whole width of the strip from the inner to the outer edge, thereby curving it to the desired form. In this instance it is supposed that the edge $i$ is not reduced in thickness at all, though it is obvious that the rolls might act to reduce the inner edge somewhat also, though in less degree than the outer edge.

Figure 8:
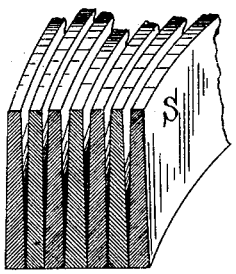

Fig. 8 shows in cross-section a number of turns of a spiral or a number of strips of the shape of Fig. 7, assembled to make a laminated core or portion of core. As will be seen, each strip or layer is tapered from the inner periphery of the core to the outer periphery, thus separating the successive strips or turns at all points, excepting near or at the inner edge, thus forming an insulated space which prevents the circulation of physical currents.

Figure 9:
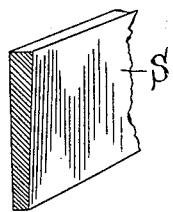
Figure 10:
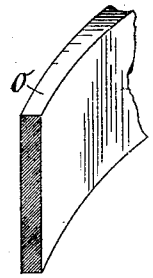

Fig. 9 shows a form which the straight bar or strip may have previous to rolling. In this case the outer edge of the straight strip is thicker than the inner edge, and the rolling or compression may reduce the form of the strip in cross-section to that of a rectangle, as shown in Fig. 10, but with the effect as before of causing the strip to take on a curved form, which is the form of the core of the electromagnet in which the said rolled strip is used. In this case it is obvious that the reducing operation upon the straight strip, like Fig. 9, would be performed by rolls whose surfaces are parallel. This form of strip in which the sides are parallel or the strip is rectangular in section, after being formed into the curved shape, is useful in making large armatures where the separate layers can be well insulated and the whole tightly bolted together.

Figure 11:
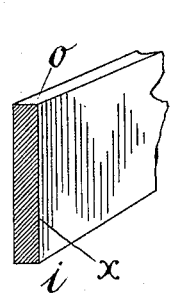
Figure 12:
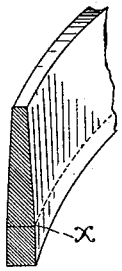
Figure 13:
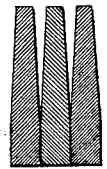

Fig. 12 shows another form into which the strip may be rolled or compressed in cross-section, Fig. 11 being the form before rolling. In this case the taper is made to extend across part of the surface of the strip only, as from $o$ to $x$, Fig. 11. This would cause the strip to assume a curve formed as described, the operation not being interfered with by the part from $x$ to $i$, which is small enough to bend without crimping. This form is adapted for use, as indicated in Fig. 13, where the several layers will present plain surfaces to one another that may allow of bolting them firmly together.

Figs. 14 and 15 show how a curved armature-core formed of a strip by compressing one edge thereof, as described, may be mounted upon a shaft. N N are spiders of the usual form, and B small bolts which pass through the strips S, as shown in Fig. 14, in which case the bolts keep the core in position. In Fig. 15 two spiders N and N are indicated, which have arms $a$, extending horizontally parallel to the armature-shaft to form supports for the curved core, consisting of the spiral strip S. In this case it is not necessary to use bolts. The armature will be held in place by the flanges or extensions of the spider extending radially beyond the arms $a$. The core S, having been made by rolling and compressing the spiral, as before described, is simply mounted by slipping the two sides of the spider into its interior and securing said spiders in position upon the shaft.

Figs. 16 and 17 illustrate the application to the curved strip of field-poles P, bolted to the laminated cylinder, the whole being kept in position by means of the spider N.

Fig. 18 illustrates a machine wherein the cores of both armature and field-magnet are constructed of the curved strips formed according to my invention. In this instance the pole-pieces are dispensed with, and owing to the greater surface offered for wire on the field-magnet a single turn or very few layers of wire can be used, so that the iron of the two parts will be near enough together to enable the machine to operate with economy. The field-wire is shown wound so as to produce alternating poles, as indicated by the signs positive and negative.

Fig. 19 illustrates a segment or curved piece for a strip made according to my invention. These segments can be cut from spirals or be rolled out of short pieces when continuous strips or complete spirals are not required, and the segments may be assembled and used in the way in which segmental strips of sheet-iron have heretofore been employed.

It is obvious that any size or diameter of cylinder can be made according to my invention by forming or regulating the rollers so that the outer edge of the strip shall be more or less extended as compared with the inner edge.

What I claim as my invention is—

1. A curved or bent core for electromagnets, composed of one or more turns or parallel members each consisting of a thin iron bar or strip rolled or compressed at its outer edge or periphery and thereby formed to the curve of the core for the finished magnet.

2. An annular or cylindrical laminated core for electromagnets consisting of a continuous spiral strip rolled laterally at one edge and thereby caused to curve edgewise, as and for the purpose described.

3. A curved laminated magnet-core formed by a rolled strip or strips assembled side by side and each thinner at one edge than at the other.

4. In a magnet-core, a rolled curved strip of iron tapered or thinned toward one edge and flat near its other, as and for the purpose described.

Signed at Wolfborough, in the county of Carroll and State of New Hampshire, this 12th day of October, A. D. 1894.

ADDISON G. WATERHOUSE.

Witnesses:
 A. WIGGIN,
 GEO. L. G. WATERHOUSE.